United States Patent
Zebian et al.

(10) Patent No.: US 11,807,049 B2
(45) Date of Patent: Nov. 7, 2023

(54) PNEUMATIC VEHICLE TIRE HAVING AN ACOUSTIC ELEMENT

(71) Applicant: Continental Reifen Deutschland GmbH, Hannover (DE)

(72) Inventors: Makram Zebian, Hannover (DE); Oliver Schuermann, Langenhagen (DE); Gueltekin Oezdogan, Hannover (DE)

(73) Assignee: Continental Reifen Deutschland GmbH, Hannover (DE)

( * ) Notice: Subject to any disclaimer, the term of this patent is extended or adjusted under 35 U.S.C. 154(b) by 930 days.

(21) Appl. No.: 16/471,592

(22) PCT Filed: Oct. 19, 2017

(86) PCT No.: PCT/EP2017/076668
§ 371 (c)(1),
(2) Date: Jun. 20, 2019

(87) PCT Pub. No.: WO2018/114086
PCT Pub. Date: Jun. 28, 2018

(65) Prior Publication Data
US 2020/0094630 A1 Mar. 26, 2020

(30) Foreign Application Priority Data
Dec. 20, 2016 (DE) .................... 10 2016 225 552.5

(51) Int. Cl.
*B60C 19/00* (2006.01)
(52) U.S. Cl.
CPC ...... *B60C 19/002* (2013.01); *B60B 2900/133* (2013.01)

(58) Field of Classification Search
CPC ..... B60C 19/00; B60C 19/002; B60C 19/122; B60C 5/00; B60B 2900/133; B60B 21/12; B60B 17/0017; B60B 17/0024
See application file for complete search history.

(56) References Cited

U.S. PATENT DOCUMENTS 7,188,652 B2 * 3/2007 Yukawa ................ B60C 19/002
152/450
7,337,814 B2 * 3/2008 Ishida ................... B60C 19/002
(Continued)

FOREIGN PATENT DOCUMENTS

CN 103978852 A 8/2014
DE 602004009533 T2 7/2008
(Continued)

OTHER PUBLICATIONS

International Search Report dated Jan. 8, 2018 of international application PCT/EP2017/076668 on which this application is based.

*Primary Examiner* — Edgardo San Martin
(74) *Attorney, Agent, or Firm* — Gregory Adams; Richard Wolf (57) ABSTRACT

The invention relates to a pneumatic vehicle tire (L) having at least one acoustic element (8), wherein the tire (L), fitted on a wheel rim (16), encloses with the rim (16) a space inside the tire (17), wherein the acoustic element (8) comprising a body (12) and a layer (13) is arranged on an inner tire surface (10) involved in delimiting the space inside the tire (17), wherein the body (12) is arranged on the inner tire surface (10) and wherein the layer (13) is arranged on a surface region of the body (12) that is facing the space inside the tire (17). The object is to provide a tire which has improved acoustic properties with less use of porous noise-reducing material and the acoustic element of which is more resistant to pressure changes. This is achieved in that the layer (13) is arranged on at least 15% of that surface of the (Continued)

body (12) which faces toward the space inside the tire (17), in that the layer (13) has a first surface region (9) which is arranged at a distance from the inner tire surface (10), in that the first surface region (9) is connectable pneumatically to a surface region (11) lying opposite it and in that the layer (13) has a sound reflectance of at least 80% for a sound wave striking the first surface region (9). The invention also relates to a wheel rim (16) and to a wheel having such an acoustic element (8).

19 Claims, 3 Drawing Sheets

(56) References Cited

U.S. PATENT DOCUMENTS

| | | | |
|---|---|---|---|
| 7,500,499 B2* | 3/2009 | Tanno | B60C 19/002 |
| 7,717,146 B2* | 5/2010 | Yukawa | B60C 19/002 |
| | | | 152/450 |
| 8,151,930 B2 | 4/2012 | Yukawa | |
| 8,746,302 B2* | 6/2014 | Sachdev | B60C 19/002 |
| 9,315,076 B2* | 4/2016 | Sakakibara | B60C 5/00 |
| 10,471,781 B2* | 11/2019 | Tyburski | B29D 30/0685 |
| 10,632,790 B2* | 4/2020 | Kon | B60C 13/02 |
| 10,675,922 B2* | 6/2020 | Jacob | B60C 19/122 |
| 10,787,044 B2* | 9/2020 | Schuermann | B60C 19/002 |
| 2001/0008159 A1 | 7/2001 | Dodt et al. | |
| 2006/0157180 A1 | 7/2006 | Tanno et al. | |
| 2010/0000640 A1 | 1/2010 | Kierzkowski et al. | |
| 2011/0000596 A1 | 1/2011 | Sachdev et al. | |
| 2012/0073717 A1 | 3/2012 | Agostini et al. | |
| 2014/0014248 A1 | 1/2014 | Parfondry et al. | |
| 2014/0034204 A1 | 2/2014 | Sakakibara et al. | |
| 2016/0159143 A1 | 6/2016 | Kierzkowski et al. | |
| 2017/0015146 A1 | 1/2017 | Tyburski et al. | |
| 2019/0061440 A1* | 2/2019 | Imai | B60C 19/002 |
| 2020/0001667 A1* | 1/2020 | Mizutani | B60C 19/002 |
| 2020/0062046 A1* | 2/2020 | Sakakibara | B60C 19/002 |

FOREIGN PATENT DOCUMENTS

| | | | | |
|---|---|---|---|---|
| DE | 102007028932 A1 | 12/2008 | | |
| DE | 112004001430 B4 | 1/2017 | | |
| DE | 102017210916 A1 * | 1/2019 | | |
| DE | 102017210918 A1 * | 1/2019 | | |
| DE | 102017210927 A1 * | 1/2019 | | |
| EP | 3266627 B1 * | 9/2020 | | B60C 19/002 |
| EP | 3572247 B1 * | 6/2021 | | B60C 19/002 |
| JP | 04334603 A * | 11/1992 | | B60C 13/004 |
| JP | 2004276809 A | 10/2004 | | |
| JP | 2006168510 A | 6/2006 | | |
| JP | 2007099162 A | 4/2007 | | |
| JP | 2009513440 A | 4/2009 | | |
| JP | 2014031087 A | 2/2014 | | |
| JP | WO2012090311 A1 | 6/2014 | | |
| KR | 20210047384 A * | 4/2021 | | B60C 19/002 |
| WO | 2015092497 A1 | 6/2015 | | |

\* cited by examiner

“PNEUMATIC VEHICLE TIRE HAVING AN ACOUSTIC ELEMENT”

BACKGROUND OF THE INVENTION

The invention relates to a pneumatic vehicle tire having at least one acoustic element, wherein the pneumatic vehicle tire, fitted on a wheel rim, encloses with the rim a space inside the tire, wherein the acoustic element comprising a body and the layer is arranged on an inner tire surface involved in delimiting the space inside the tire, wherein the body is arranged on the inner tire surface and wherein a layer is arranged on a surface region of the body that is facing the space inside the tire. The invention also relates to a wheel rim having an acoustic element and to a vehicle wheel having such a rim and/or such a pneumatic vehicle tire.

When a pneumatic vehicle tire fitted in an airtight manner on a wheel rim is rolling on a carriageway, noises are produced by vibrations of the air in the space inside the wheel that is enclosed by the tire and the rim, which are transmitted both into the passenger compartment of the vehicle and to the surroundings outside the vehicle.

To reduce such noises, it is known from DE 10 2007 028932 A1 to attach a foam ring to the inner side of the pneumatic vehicle tire as a damping element. This damping element reduces the vibrations of the air in the space inside the wheel, which improves the noise behavior of the vehicle.

DE 11 2004 001 430 T5 discloses a pneumatic vehicle tire with a strip-shaped noise-absorbing porous material of a height of 15 mm and an axial width of 150 mm, which is fastened to an inner tire surface by using an elastic fixing strip of an axial width of 30 mm.

However, the use of material for such damping elements involves high costs.

Furthermore, DE 60 2004 009 533 T2 discloses a vehicle tire with noise dampers of an ether-based polyurethane sponge, wherein the noise damper has an outer coating, which is formed by a polyethylene film of a thickness of 0.06 mm in which the sponge-like material is completely wrapped. However, the volume of the sponge is also sealed by the film in an airtight manner with respect to the rest of the space inside the tire, which adversely influences not only the resistance of the arrangement to the buildup of internal pressure when fitting the tire and to internal pressure fluctuations when operating the tire but also the acoustic properties of the noise damper.

SUMMARY OF THE INVENTION

The object of the present invention is to provide a pneumatic vehicle tire which has improved acoustic properties with less use of porous noise-reducing material and the acoustic element of which is more resistant to pressure changes.

The object is achieved by the layer being arranged on at least 15%, preferably at least 20%, particularly preferably at least 30%, of the surface of the body that is facing the space inside the tire, in that the layer has a first surface region arranged at a distance from the inner tire surface, in that the first surface region can be connected pneumatically to a surface region of the layer lying opposite it and in that the layer has an acoustic reflectance of at least 80% for a sound wave striking the first surface region, measured at a reference frequency f of $f=c/((R+r)\cdot\pi)$, where R is the nominal tire diameter and r is the nominal rim diameter and $c=343$ m/s.

It has been found that a pneumatic vehicle tire which has such an acoustic element comprising a layer with a strongly reflecting first surface region has during operation a more uniform distribution of the sound pressure level over the sound frequencies and reduced sound pressure level peaks than a tire without such acoustic elements. In particular, the tire may have an additional resonant frequency, wherein the sound pressure level at this additional resonant frequency has a higher sound pressure level than in the case of a tire without the acoustic element. As a result, the sound pressure level at the additional resonant frequency increases. At the same time, the sound pressure level at other frequencies may be reduced. It has been found to be particularly advantageous if the first surface region has a sound reflectance of at least 80%. The sound reflectance is measured at a reference frequency f, where f is given by $f=c/((R+r)\cdot\pi)$. R is in this case the nominal diameter of the tire, r the nominal diameter of the wheel rim and $c=343$ m/s. The sound reflectance may be measured for a sound wave striking the first surface region perpendicularly from the medium of air under standard conditions, i.e. at an air pressure of 1013.25 hPa and a temperature of 293.15 K. The sound reflectance may be measured in accordance with DIN EN ISO 10534-2. The acoustic properties of the body are entirely or largely disregarded here.

As a result of the more uniform distribution of the sound pressure level over the sound frequencies, in particular as a result of the additional resonant frequency, there is therefore at least partially a redistribution of the sound pressure level. What is significant in this case is that, as a result, the sound pressure level at the original resonance or resonances of the tire, that is to say the resonances of a tire without such an acoustic element, is reduced. In particular, the maximum value of a sound pressure level that such a tire has is reduced. Such a tire consequently has improved acoustic properties without it being necessary to use cost-intensive porous material suitable for noise reduction.

A body arranged in the space inside the tire influences the tire properties such as concentric running, rolling resistance, etc. It is generally advantageous for such properties if the use of material for elements arranged in the space inside the tire is kept down. It has been found to be particularly efficient for the relationship between noise reduction and use of material, especially for the body, if the layer is arranged on at least 15%, preferably at least 20%, particularly preferably at least 30%, of the surface of the body which is facing the space inside the tire. In this case, preferably at least 90% of the surface of the layer which is facing the space inside the tire is formed as the first surface region. The layer may be formed contiguously or by two or more pieces at a distance from one another. Each piece then has a first surface region and a second surface region. The layer may in this case be entirely or partially connected to the body in a material-bonding manner.

Lying opposite means that the first surface region and the surface region of the layer lying opposite it can be connected by a line running within the layer perpendicularly to the two surface regions.

"Can be connected pneumatically" means in the context of the invention that there is a connection through which air can pass between the first surface region and the surface region of the layer lying opposite it, whereby air can pass from the first surface region to the surface region lying opposite it. As a result, an exchange of air and an equalization of pressure are made possible between the volumes adjacent to the two surface regions. The body or further elements, other than the layer, of the acoustic element are disregarded here. Such a connection through which air can pass may be created by an opening through which air can pass in the layer and/or a permeability of the layer with respect to air and/or an arrangement of the layer which has around a free end of the layer a connection of the two surface regions through which air can pass. In this case, the layer has a free end. The two surface regions of the layer are consequently arranged in a region of the layer that does not enclose a completely closed space.

As a result, an exchange of air and an equalization of pressure are made possible between the volumes adjacent to the two surface regions. Therefore, no special precautions have to be taken when filling the tire with air. The volume of the acoustic element is largely independent of the internal pressure of the tire and of usual fluctuations of the internal pressure of the tire that occur during the operation of the tire. The arrangement, and consequently the reflection properties, of the first surface region and/or of the second surface region are also largely independent of fluctuations of the internal pressure of the tire.

Such an acoustic element is consequently more resistant to pressure changes, in particular to fluctuations of the internal pressure of the tire, both in its durability and in its acoustic properties.

This provides a pneumatic vehicle tire which has improved acoustic properties with less use of porous noise-reducing material and the acoustic element of which, and also the acoustic properties of the acoustic element, are more resistant to pressure changes.

The acoustic element or elements may in this case be arranged on an inner tire surface lying opposite a tread of a pneumatic vehicle tire. The layer may be arranged entirely or partially at a distance from the inner tire surface.

In a first embodiment, the layer has a first surface region which is arranged facing the space inside the tire and/or a first surface region which is arranged facing the body. Depending on the arrangement, the sound is preferably returned into the space inside the tire or reflected back to the body. Preferably, the surface region lying opposite is also a first surface region.

In a further embodiment, the layer has a sound reflectance of at least 90%, preferably of at least 95%, particularly preferably of at least 99%, for a sound wave of the reference frequency f striking the first surface region. Such a high reflectance makes a particularly good reduction of sound pressure level peaks possible.

In a further embodiment, the acoustic element has at least in the region of the first surface region a characteristic acoustic impedance of $0.8 \cdot 10^6$ Ns/m$^3$ to $18 \cdot 10^6$ Ns/m$^3$, preferably of $11 \cdot 10^6$ Ns/m$^3$ to $18 \cdot 10^6$ Ns/m$^3$. The characteristic acoustic impedance is a measure of the wave resistance with which a medium opposes a sound acting on the medium. The characteristic acoustic impedance Z is in this case defined as $Z=(\rho \cdot G)^{1/2}$. $\rho$ is the density under standard conditions, G is the shear modulus. The shear modulus may be measured in accordance with DIN ISO 1827. In the case of such an acoustic element, when a sound wave strikes the first surface region the position of the layer can be changed by the sound pressure, at least in the region of the first surface region, whereby sound energy can be absorbed.

In the context of the invention, the wording "in the region of the first surface region" comprises a region of the layer comprising the entire layer thickness, wherein the region comprises at least the first surface region.

Corresponding advantages are obtained if the layer has at least in the region of the first surface region a characteristic acoustic impedance of $0.8 \cdot 10^6$ Ns/m$^3$ to $18 \cdot 10^6$ Ns/m$^3$, preferably of $11 \cdot 10^6$ Ns/m$^3$ to $18 \cdot 10^6$ Ns/m$^3$.

It has been found that a characteristic acoustic impedance Z of the acoustic element and/or of the layer in the region of the first surface region of $0.8 \cdot 10^6$ Ns/m$^3$ to $18 \cdot 10^6$ Ns/m$^3$ is essential and causal for an efficient noise reduction. A characteristic acoustic impedance of $0.8 \cdot 10^6$ Ns/m$^3$ to $6 \cdot 10^6$ Ns/m$^3$ and/or a characteristic acoustic impedance of between $6 \cdot 10^6$ Ns/m$^3$ and $11 \cdot 10^6$ Ns/m$^3$ and/or a characteristic acoustic impedance of $11 \cdot 10^6$ Ns/m$^3$ to $18 \cdot 10^6$ Ns/m$^3$ is advantageous.

It has also been found to be important that, in the case of such an acoustic element, the characteristic acoustic impedance is largely independent of internal pressure fluctuations of the wheel. The characteristic acoustic impedance is in particular more independent of internal pressure fluctuations of the wheel than in the case of an acoustic element with a layer which surrounds the entire body in an airtight manner.

In an advantageous embodiment, the layer has at least in the region of the first surface region a flexural stiffness of 100 Nm to 6000 Nm, preferably a flexural stiffness of 1000 Nm to 6000 Nm. The flexural stiffness is given by $E \cdot h^3/(12 \cdot (1-\mu^2))$. The modulus of elasticity E may be measured in accordance with DIN EN ISO 6721-1 to 6721-3. The Poisson's ratio $\mu$ may be measured in accordance with DIN EN ISO 527-1. h denotes the thickness of the layer. Such a layer is outstandingly suitable as a mass of a membrane absorber for sound absorption. This also brings about a noise absorption by changing the position of the first surface region.

It is also advantageous if the acoustic element under the effect of a force perpendicular to the first surface region has a spring constant of 100 N/m to 20 000 N/m. Together with the aforementioned mass, this produces a membrane absorber which is even better suited for sound absorption. It is expedient in this case if the body has under the effect of a force from a direction perpendicular to the first surface region a spring constant of 100 N/m to 1000 N/m and/or a spring constant of between 1000 N/m and 8000 N/m and/or a spring constant of 8000 N/m to 20 000 N/m. Suitably combining the mass and the spring constant allows for example the frequency that is preferably absorbed to be set.

In a further embodiment, the layer has at least in the region of the first surface region a flexural stiffness of $6 \cdot 10^{-6}$ Nm to $1 \cdot 10^{-2}$ Nm, preferably of $6 \cdot 10^{-6}$ Nm to $1 \cdot 10^{-4}$ Nm. With such a low flexural stiffness within the extent of the first surface region, changes in position within the respective surface region that are caused by the sound may turn out to be different locally. Also as a result of this, efficient noise absorption is made possible.

Also a flexural stiffness of the layer at least in the region of the first surface region of between $1 \cdot 10^{-2}$ Nm and 100 Nm, preferably between 1 Nm and 10 Nm, has been found to be advantageous.

In an advantageous embodiment, all of the normal vectors of the first surface region form an angle of less than 90°, preferably an angle of 0° to 45°, particularly preferably an angle of 0° to 30°, with the radial direction. It is also advantageous if all of the normal vectors of the first surface region form an angle of 0° to 10°, preferably of 0° to 5°, with the radial direction.

It is expedient in this case if all of the normal vectors of the first surface region have a radially inwardly oriented component. The volume of the space inside the tire which lies radially outside such a surface region, having a high reflectance, contributes to a reduced extent to a room mode at the additional resonant frequency, which is conducive to a redistribution of the sound pressure level to higher frequencies.

However, it is also expedient if all of the normal vectors of the first surface region have a radially outwardly oriented component. The volume of the space inside the tire which lies radially inside such a surface region, having a high reflectance, consequently contributes to a reduced extent to a room mode at the additional resonant frequency, which is conducive to a redistribution of the sound pressure level to lower frequencies.

It has proven to be advantageous if all of the normal vectors of the first surface region form an angle of 0° to 45°, preferably of 0° to 30°, particularly preferably of 0° to 10°, with the axial direction or the circumferential direction.

In a particularly preferred embodiment, the acoustic element has a damping element, which is formed from a porous material, preferably from a foam, and is suitable for reducing noises. As a result, the acoustic element makes a further reduction of the sound possible. This may take place by absorption of sound by the porous material of the damping element.

It is expedient if the body comprises the damping element or is formed by the damping element or if the damping element is arranged on the first surface region or if the damping element is arranged on the first surface region and all of the normal vectors have a radially inwardly oriented component. As a result, even more efficient noise reduction is made possible along with a simple construction of the acoustic element.

It is also expedient if the damping element is firmly connected to the tire surface by means of a bonding agent.

The porous material may be standard ContiSilent® foam and/or for example polyurethane or polyester with a density of 20 kg/m$^3$ to 85 kg/m$^3$ and a hardness of 3.5 kilopascals to 10 kilopascals. Further possible porous materials comprise a mixture of polyurethane and/or polyester and/or polyether, or polyether-based or polyester-based polyurethane foams, and/or comprise any desired sound-absorbing material mixture, for example glass wool or rock wool, loop-pile fabric or deep-pile fabric or nonwoven materials or cork. Further possible porous materials which are suitable for use as a damping element are for example a melamine resin foam or a construction foam. Furthermore, the material of the damping element has in particular a density of for example up to 100 kg/m$^3$ and/or a compression hardness of for example 1.5 kilopascals.

The bonding agent may be a sealant and/or an adhesive. When attaching a damping element to the surface of the tire, it is preferably a sealant, particularly preferably an automatically sealing sealant. When attaching a damping element to the surface of the wheel rim, it is preferably an adhesive.

The sealant is in particular a polyurethane gel or a butyl rubber-based sealant. It is preferably a butyl rubber-based sealant in combination with an adhesive. The adhesive may be an adhesive tape and/or a silicone-based adhesive and/or a two-component adhesive and/or a construction adhesive and/or a polyurethane adhesive and/or a rubber-based adhesive and/or a tire repair adhesive and/or an instant adhesive and/or an adhesive based on cyanoacrylate and/or based on a water-based acrylic system with a polyethylene terephthalate structure and/or based on acrylonitrile-butadiene rubber with a formaldehyde resin dissolved in acetone and/or based on a silane polyether and/or based on a polybutene crosslinked with butyl rubber and/or based on an alkoxy silicone.

It is advantageous if the body has a surface region facing the space inside the tire that is delimited by edges and if the layer is arranged on the surface region. The layer may in this case extend over the entire surface region or only part of the surface region. The layer may also extend beyond the edges of the surface region. The layer may be arranged entirely or partially at a distance from the edges of the surface region. Partially at a distance means here that the layer is not arranged at a distance from all of the edges.

It is expedient if the damping element has a number of N surface regions facing the space inside the tire that are delimited from one another by edges, wherein the layer is arranged on 1 to N−1 surface regions of the altogether N surface regions of the damping element. For example, the damping element may be formed as a cuboid and be attached with one side to the tire inner surface. There consequently remain 5 surface regions facing the space inside the tire that are delimited from one another by edges. Here, the layer may be arranged on 1, 2, 3 or 4 of the surface regions.

It is advantageous if the damping element or the body has a through-opening and if the layer is arranged on the surface lining the opening.

The geometrical form of the damping element or of the body may taper in the radial direction or counter to the radial direction or remain constant. It may be for example a cuboid, a pyramid, a frustum of a pyramid, an inverted frustum of a pyramid, a parallelepiped or a general cylinder. It may be a perpendicular or angled three-dimensional form.

It is advantageous if the layer has a layer thickness of 0.01 mm to 20 mm. Not only layers with a small layer thickness of 0.01 mm to 5 mm but also layers with a moderate layer thickness of between 5 mm and 12 mm and layers with a greater layer thickness of 12 mm to 20 mm have been found to be suitable and advantageous.

The layer may be designed as air-permeable or air-impermeable. The layer may be designed as water-impermeable or water-permeable.

The layer is arranged entirely or partially on the surface of the body.

The layer may in this case be selected from the group formed by a plastic film, a metal film, preferably an aluminum film, a fabric-reinforced membrane, a layer comprising natural materials, a layer comprising carbon fibers, a layer comprising aramid, a cured coating, a lacquer or a layer of rubber, preferably a layer of sponge rubber, a coating of the surface of the body and an untreated outer surface of the body. Such layers have outstanding reflection properties.

The layer may be designed as an element of the acoustic element other than the body, preferably as a film. In this case, the layer may be connected to the body by means of a bonding agent. The layer may comprise natural materials such as cork or a resin, preferably an epoxy resin-based resin, or carbon fibers or aramid.

The layer may form or be involved in forming the surface of the body. The layer may also be an untreated outer surface of the body, preferably an untreated outer surface of the porous material of the damping element. The layer may be the skin of the foam of the damping element that is produced during the foaming. As a result, an efficient acoustic element of a simple construction is created. The coating may be applied in a liquid state to the damping element and then cured. The untreated outer surface may be the untreated outer surface of the porous material of the damping element after the production process of the porous material. It is consequently not a cut surface. It is for example the natural surface of a foam.

It is expedient if the body of the acoustic element is formed as closed in the circumferential direction. It is advantageous if the first surface region is formed as closed in the circumferential direction. As a result, a very simple design with good properties of uniformity is obtained.

However, the first surface region may also only extend over a partial region of the circumference of the tire. It is also expedient if the acoustic element has a number of first surface regions which are arranged facing the space inside the tire. It is also expedient if the acoustic element has a number of first surface regions which are arranged facing the body. The said surface regions may all be assigned to the same layer or to a number of layers arranged at a distance from one another.

For an efficient redistribution of the sound pressure level, it is advantageous if two, three or more acoustic elements are arranged distributed over the circumference of the tire. As a result, material is saved in comparison with an enclosing element. The acoustic elements may all be formed the same or at least partially different from one another. They may for example differ from one another in their size or geometry. At least two acoustic elements may be arranged at a distance or overlapping in their axial extent.

It is expedient if the pneumatic vehicle tire has one or more further damping elements.

The acoustic element according to the invention may also be arranged on a wheel rim and/or instead on the tire inner surface on a wheel rim. In this case, with regard to all of the embodiments that are disclosed in the description and are arranged on the tire inner surface in a way corresponding to the description, the acoustic element according to the invention may be arranged on the inner rim surface delimiting the space inside the tire.

The axial direction, the radial direction and the circumferential direction of the pneumatic tire coincide with an axial direction, a radial direction and a circumferential direction of the wheel rim.

The invention consequently also relates in particular to a wheel rim having at least one acoustic element, wherein a pneumatic vehicle tire fitted on the wheel rim forms with the rim a space inside the tire, wherein an acoustic element comprising a body and a layer is arranged on an inner rim surface involved in delimiting the space inside the tire, wherein the body is arranged on the inner rim surface and wherein a layer is arranged on a surface region of the body that is facing the space inside the tire, wherein the layer is arranged on at least 15%, preferably on at least 20%, particularly preferably on at least 30%, of the surface of the body that is facing the space inside the tire, wherein the layer has a first surface region arranged at a distance from the inner rim surface, wherein the first surface region can be connected pneumatically to a surface region of the layer lying opposite it and wherein the layer has a sound reflectance of at least 80% for a sound wave striking the first surface region, measured at a reference frequency f of $f=c/((R+r)\cdot\pi)$, where R is the nominal tire diameter and r is the nominal rim diameter and $c=343$ m/s.

It has been found in this case to be particularly advantageous if the acoustic element has a damping element, which is formed from a porous material and is suitable for reducing noises.

The invention also relates to a vehicle wheel with a wheel rim and a pneumatic vehicle tire fitted on the wheel rim, wherein the wheel rim and/or the pneumatic vehicle tire have according to the invention at least one acoustic element.

It may be a wheel, a tire or a wheel rim for a passenger car, a van, an SUV, a light truck, a commercial vehicle, a motorcycle or a bus.

BRIEF DESCRIPTION OF THE DRAWINGS

Further features, advantages and details of the invention are now explained more specifically on the basis of the schematic drawings, which depict exemplary embodiments. In the drawings.

DETAILED DESCRIPTION

Figure 1:
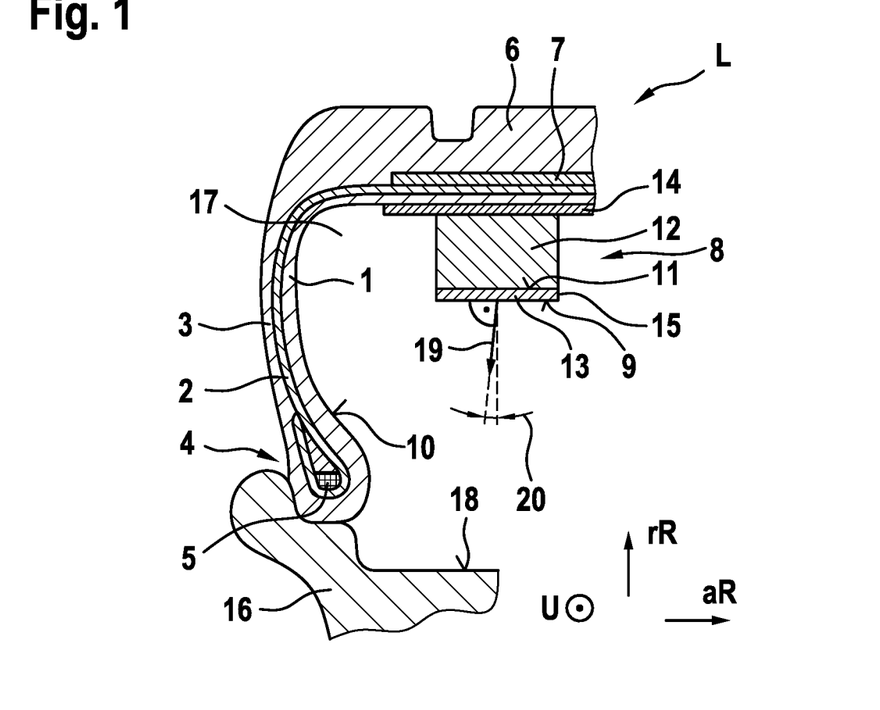
FIG. 1 shows a radial partial cross section through a vehicle wheel according to the invention having at least one acoustic element according to the invention.

FIG. 1 shows a radial partial cross section through a vehicle wheel with a wheel rim 18 and a pneumatic vehicle tire L of a radial type of construction fitted on the rim 18. The essential components from which the depicted pneumatic vehicle tire L is composed are a largely air-impermeable inner layer 1, a carcass 2 which comprises at least one reinforcing layer and conventionally reaches from the region of the crown of the pneumatic vehicle tire L over the sidewalls 3 into the bead regions 4 and is anchored there by wrapping around high-tensile bead cores 5, a profiled tread 6 located radially outside the carcass 2 and a multi-ply belt assembly 7 arranged between the tread 6 and the carcass 2. This may be a wheel for a passenger car or for a commercial vehicle.

The tire L according to the invention may be fitted in an airtight manner on a wheel rim 16. The wheel rim may be formed in one piece or more than one piece. The space enclosed by the wheel rim and the tire is referred to as the space inside the tire 17, the surface delimiting the space inside the tire 17 as the inner tire surface 10 or as the inner rim surface 18.

Arranged on the radially inner tire surface 10 lying opposite the tread 6 is an acoustic element 8 comprising a body 12 and a layer 13. The body 12 is arranged on the inner tire surface 10 and is connected to it by means of a bonding agent 14.

A layer 13 is arranged on a surface region of the body 12 that is facing the space inside the tire 17. The layer 13 is in this case arranged on at least 15%, preferably on at least 20%, particularly preferably on at least 30%, of the surface of the body 12 that is facing the space inside the tire 17.

The layer 13 has a first surface region 9 facing the space inside the tire 17 and arranged at a distance from the inner tire surface 10. The layer 13 also has a surface region 11 lying opposite the first surface region 9. The two surface regions 9, 11 may be connected by a line running within the layer 13 perpendicularly to the two surface regions 9, 11.

The first surface region 9 can be connected pneumatically to the opposite surface region 11 of the layer. In the case depicted, the layer 13 has for this an arrangement which has around a free end 15 of the layer 13 a connection of the two surface regions 9, 11 through which air can pass. The two surface regions 9, 11 of the layer 13 are consequently arranged in a region of the layer that does not enclose a completely closed space. Such a connection through which air can pass can also be created by an opening through which air can pass in the layer 13 and/or a permeability of the layer 13 with respect to air.

The first surface region 9 of the layer 13 has a sound reflectance of at least 80%, measured at a reference frequency f of $f=c/((R+r)\cdot r)\cdot \pi)$ under standard conditions in accordance with DIN EN ISO 10534-2, where R is the nominal tire diameter and r is the nominal rim diameter and c=343 m/s. The sound reflectance may be at least 90%, preferably at least 95%, particularly preferably at least 99%.

The layer 13 has a first surface region 9, which is arranged facing the space inside the tire 17. The opposite surface region 11 is arranged facing the body 12. Also the opposite surface region 11 may be designed as the first surface region with a corresponding reflectance.

The layer 13 has at least in the region of the first surface region 9 a characteristic acoustic impedance of $0.8 \cdot 10^6 Ns/m^3$ to $18 \cdot 10^6 Ns/m^3$, preferably of $11 \cdot 10^6 Ns/m^3$ to $18 \cdot 10^6 Ns/m^3$.

The layer 13 has at least in the region of the first surface region a flexural stiffness of 100 Nm to 6000 Nm and a spring constant of 100 N/m to 20 000 N/m. The layer 13 may however also have at least in the region of the first surface region a flexural stiffness of $6 \cdot 10^{-6}$ Nm to $1 \cdot 10^{-2}$ Nm and a spring constant of 100 N/m to 20 000 N/m.

All of the normal vectors 19 of the first surface region 9 and of the opposite surface region 11 form an angle 20 of less than 90°, preferably an angle 20 of 0° to 10°, preferably of 0° to 5°, with the radial direction rR. All of the normal vectors 19 of the first surface region 9 have a radially inwardly oriented component. All of the normal vectors 19 of the opposite surface region 11 have a radially outwardly oriented component. All of the normal vectors 19 of the first surface region 9 are oriented in one direction and all of the normal vectors 19 of the opposite surface region 11 are oriented in the direction opposite thereto.

The acoustic element 8 has a damping element, which is formed from a porous material and is suitable for reducing noises. In this case, the body 12 is formed by the damping element. The damping element is connected to the inner tire surface 10 by means of a bonding agent 14, preferably by means of an automatically sealing sealant. The porous material may be a foam. From radially outside to radially inside, the sequence of elements is as follows: inner tire surface 10, bonding agent 14, damping element 12, layer 13.

The body 12 has a surface region facing the space inside the tire 17 that is delimited by edges 21 and on which the layer 13 is arranged.

The layer 13 has a layer thickness of from 0.01 mm to 20 mm. The layer thickness is the length of the radial extent. Not only layers with a small layer thickness of 0.01 mm to 5 mm but also layers with a moderate layer thickness of between 5 mm and 12 mm and layers with a greater layer thickness of 12 mm to 20 mm have been found to be suitable and advantageous. The layer 13 may be designed as air-permeable or air-impermeable. The layer 13 may be designed as water-impermeable or water-permeable.

The layer 13 may in this case be selected from the group formed by a plastic film, a metal film, preferably an aluminum film, a fabric-reinforced membrane, a layer comprising natural materials, a layer comprising carbon fibers, a layer comprising aramid, a cured coating, a lacquer or a layer of rubber, preferably a layer of sponge rubber, a coating of the surface of the body and an untreated outer surface of the body. Such layers have outstanding reflection properties.

The layer 13 may be designed as an element of the acoustic element 8 other than the body 12, preferably as a film. In this case, the layer 13 may be connected to the body 12 by means of a bonding agent. The layer 13 may comprise natural materials, preferably cork or a resin, preferably an epoxy resin-based resin, or carbon fibers or aramid.

The layer 13 may form or be involved in forming the surface of the body 12. The layer 13 may also be an untreated outer surface of the body 12, preferably an untreated outer surface of the porous material of the damping element. The layer 13 may be the skin of the foam of the damping element that is produced during the foaming. As a result, an efficient acoustic element of a simple construction is created. The coating may be applied in a liquid state to the damping element and then cured. The untreated outer surface may be the untreated outer surface of the porous material of the damping element after the production process of the porous material. It is consequently not a cut surface. It is for example the natural surface of a foam.

In the embodiment depicted, the body 12 and/or the first surface region 9 may be formed as closed in the circumferential direction U. However, the first surface region 9 may also only extend over a partial region of the circumference of the tire. However, the first surface region 9 may also only extend over a partial region of the circumference of the tire L. The acoustic element 8 may have a number of first surface regions 9 which are arranged facing the space inside the tire 17. The acoustic element 8 may also have a number of first surface regions 9 which are arranged facing the body 12. The said surface regions 9 may all be assigned to the same layer 13 or to a number of layers 13 arranged at a distance from one another.

The tire L may also have a number of acoustic elements 8 and/or damping elements.

Figure 2:
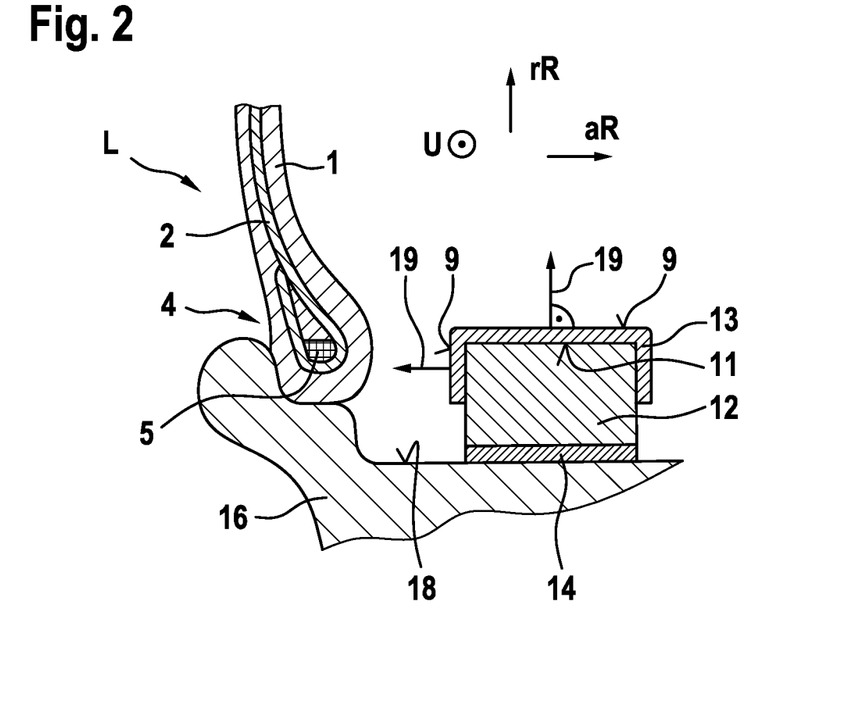
FIG. 2 shows a radial partial cross section through a vehicle wheel according to the invention having at least one acoustic element according to the invention and FIG. 3 shows acoustic elements according to the invention.

FIG. 2 shows a partial cross section of a vehicle wheel, wherein an acoustic element 8 having one or more first surfaces 9 is arranged on the inner surface 18 of the wheel rim 16. The acoustic element 8 may be designed in a way corresponding to the acoustic elements 8 described in FIG. 1. The at least one acoustic element 8 is attached to the inner surface 18 of the wheel rim 16 in a bonding manner by means of a bonding agent 14.

FIG. 3 shows various exemplary embodiments of acoustic elements 8 suitable for a pneumatic vehicle tire L as shown in FIG. 1. The acoustic elements 8 are also suitable for attachment to a wheel rim as shown in FIG. 2. In this case, the radial direction is the opposite direction.

Figure 3A:
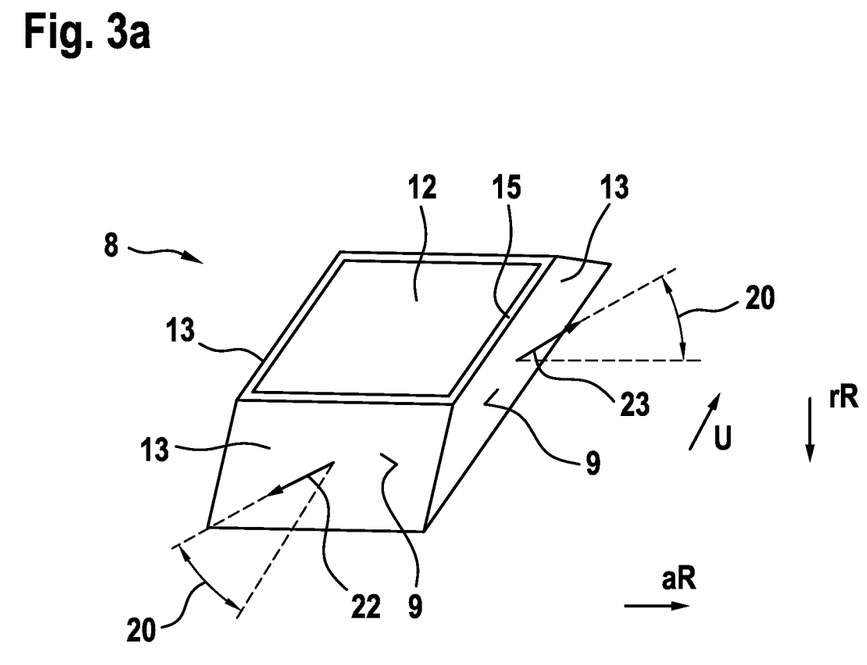

The acoustic elements 8 depicted differ from the acoustic element 8 shown in FIG. 1 as follows:

FIG. 3a shows a stump, the side regions of which are surrounded by a layer 13. All of the normal vectors 22 of the first surface regions 9 form an angle 20 of a maximum of 45°, preferably of a maximum of 30°, with the circumferential direction. All of the normal vectors 23 of the first surface regions 9 form an angle of a maximum of 45°, preferably of a maximum of 30°, with the axial direction. The layer 13 has a free end 15.

Figure 3B:
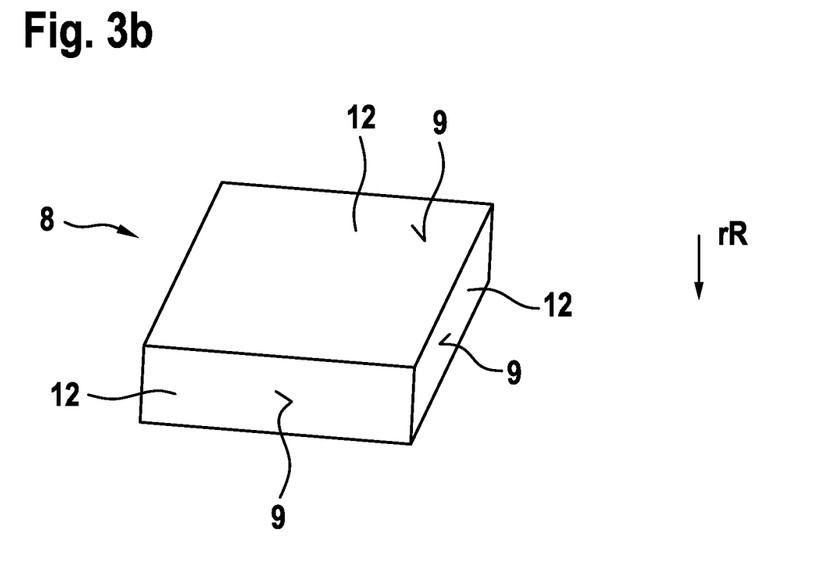

FIG. 3b shows a largely cuboidal acoustic element 8, wherein the layer 9 is arranged on the entire surface of the body 12 that is facing the space inside the tire 17. The layer 9 is formed as permeable to air.

Figure 3C:
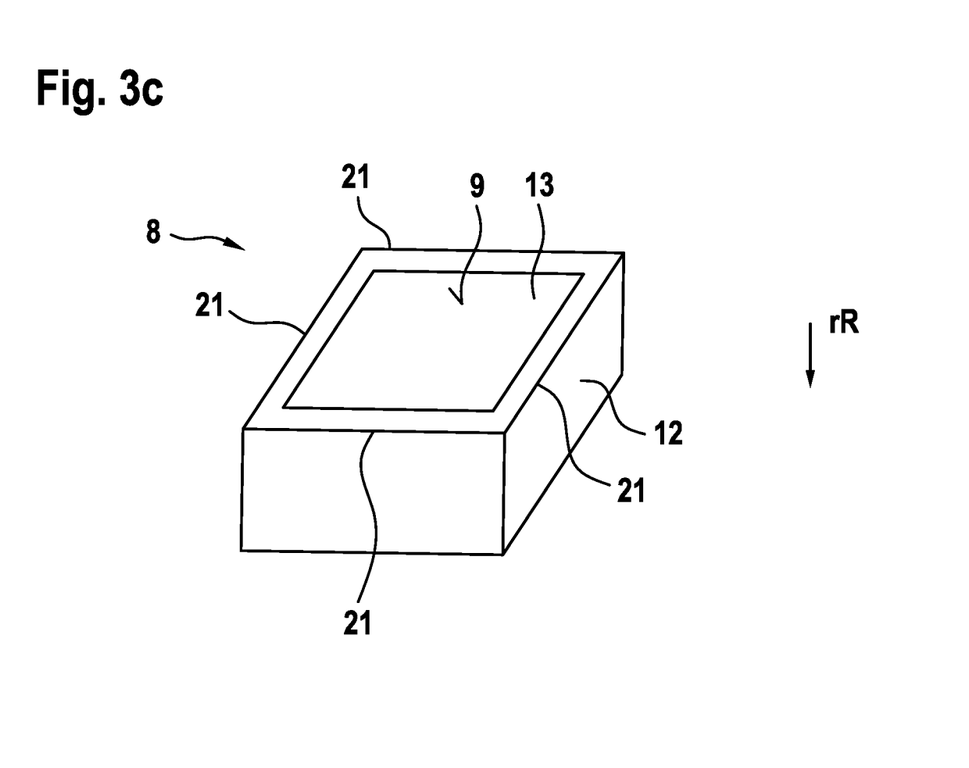

FIG. 3c shows a further cuboidal acoustic element 8, wherein the body 12 has a surface region facing the space inside the tire 17 that is delimited by edges 21, wherein the layer 13 is arranged on the surface region. The layer 13 in this case only extends over part of the surface region. The layer 13 is arranged entirely at a distance from the edges 21 of the surface region.

Figure 3D:
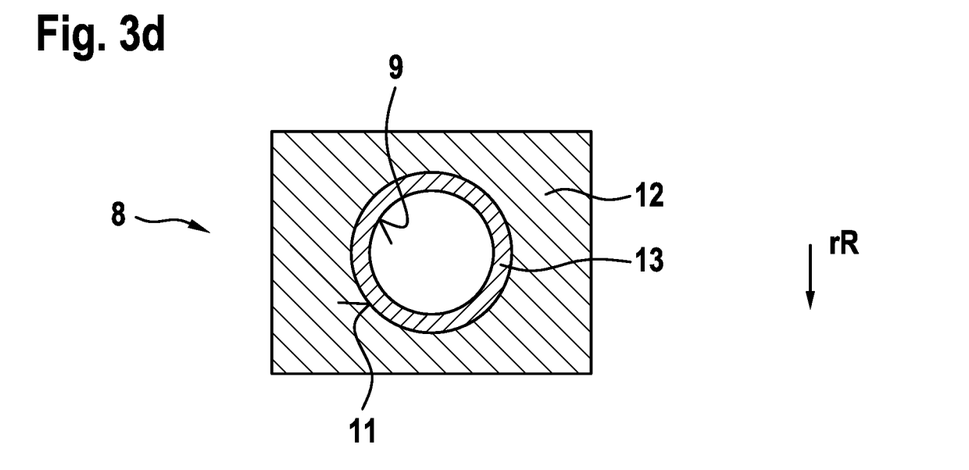

FIG. 3d shows a cross section of an acoustic element 8, wherein the body 12 has a through-opening 24. The layer 13 is arranged on the surface of the body 12 lining the opening 24.

LIST OF REFERENCE DESIGNATIONS

Part of the Description

1 Inner layer
2 Carcass
3 Sidewall
4 Bead region
5 Bead core
6 Tread
7 Belt assembly
8 Acoustic element
9 First surface region
10 Inner tire surface
11 Opposite surface region
12 Body
13 Layer
14 Bonding agent
15 Free end
16 Wheel rim
17 Space inside the tire
18 Inner rim surface
19 Normal vector
20 Angle
21 Edge
22 Normal vector
23 Normal vector
24 Through-opening
R Vehicle wheel
L Pneumatic vehicle tire
aR Axial direction
rR Radial direction
U Circumferential direction

The invention claimed is:

1. A pneumatic vehicle tire comprising:
at least one acoustic element enclosed within a space inside the vehicle tire and the wheel rim and positioned radially inward of a profiled tread of the vehicle tire;
the at least one acoustic element comprises a body and a layer, and the at least one acoustic element is arranged on an inner tire surface involved in delimiting the space inside the tire, the body is arranged on the inner tire surface, and the layer is arranged on an inner surface region of the body that is facing the space inside the tire;
the layer of the at least one acoustic element is arranged on at least 15% of the surface of the body, the layer has a first surface region arranged at a distance from the inner tire surface and facing the space inside the tire, and the first surface region has an air connection to a second surface region of the layer which is lying opposite the first surface region;
the layer of the at least one acoustic element has a sound reflectance of at least 80% for a sound wave striking the first surface region which is measured at a reference frequency (f) of:

$$f=c/((R+r)\cdot\pi)$$

where R is the nominal tire diameter, r is the nominal rim diameter, and c=343 m/s;
the first surface region having normal vectors having a radially inward component and the second surface region having normal vectors having a radially outward component to redistribute sound pressure to lower frequencies;
the body of the at least one acoustic element comprises a porous foam material for dampening noise.

2. The pneumatic vehicle tire as claimed in claim 1, wherein the layer has one or more of a first surface region which is arranged facing the space inside the tire, and a first surface region which is arranged facing the body.

3. The pneumatic vehicle tire as claimed in claim 1, wherein the layer has a sound reflectance of at least 90% for a sound wave of the reference frequency (f) striking the first surface region.

4. The pneumatic vehicle tire as claimed in claim 1, wherein one or more of the acoustic element and the layer has, at least in the region of the first surface region, a characteristic acoustic impedance of $0.8\cdot10^6$ Ns/m$^3$ to $18\cdot10^6$ Ns/m$^3$.

5. The pneumatic vehicle tire as claimed in claim 1, wherein the layer has, at least in the region of the first surface region, a flexural stiffness of 100 Nm to 6000 Nm.

6. The pneumatic vehicle tire as claimed in claim 1, wherein the acoustic element under the effect of a force perpendicular to the first surface region has a spring constant of 100 N/m to 20 000 N/m.

7. The pneumatic vehicle tire as claimed in claim 1, wherein the layer has at least in the region of the first surface region a flexural stiffness of $6\cdot10^{-6}$ Nm to $1\cdot10^{-2}$ Nm.

8. The pneumatic vehicle tire as claimed in claim 1, wherein all normal vectors of the first surface region form an angle of less than 90° relative a radial direction (rR).

9. The pneumatic vehicle tire as claimed in claim 1, wherein all of normal vectors of the first surface region form an angle of 0° to 45° an axial direction (aR) or circumferential direction (U).

10. The pneumatic vehicle tire as claimed in claim 1, wherein the acoustic element comprises a damping element, which is formed from a porous material and is suitable for reducing noises.

11. The pneumatic vehicle tire as claimed in claim 1, wherein the body has a surface region facing the space inside the tire which is delimited by edges, and wherein the layer is arranged on the surface region, entirely or partially at a distance from the edges.

12. The pneumatic vehicle tire as claimed in claim 1, wherein the layer has a layer thickness of 0.01 mm to 20 mm.

13. The pneumatic vehicle tire as claimed in claim 1, wherein the layer is selected from the group consisting of a plastic film, a metal film, a fabric-reinforced membrane, a layer comprising natural materials, a layer comprising carbon fibers, a layer comprising aramid, a cured coating, a lacquer, a layer of rubber, a coating of the surface of the body, and an untreated outer surface of the body.

14. The pneumatic vehicle tire as claimed in claim 1, wherein the first surface region is formed as closed in a circumferential direction.

15. The pneumatic vehicle tire as claimed in claim 1, further comprising a plurality of more acoustic elements are arranged distributed over the circumference of the tire, the plurality of more acoustic elements each comprising a body having a porous foam material for dampening noise and a permeable layer for conveying air.

16. The pneumatic vehicle tire as claimed in claim 1 as used for a vehicle wheel.

17. A wheel rim comprising at least one acoustic element, wherein a pneumatic vehicle tire, fitted on the wheel rim, encloses with the rim a space inside the tire;
   wherein the at least one acoustic element comprises a body and a layer, and is arranged on an inner tire surface involved in delimiting the space inside the tire, wherein the body is arranged on the inner tire surface, and wherein the layer is arranged on a surface region of the body that is facing the space inside the tire;
   wherein the layer is arranged on at least 15% of the surface of the body that is facing the space inside the tire, wherein the layer has a first surface region arranged at a distance from the inner tire surface, and wherein the first surface region can be connected pneumatically to a surface region of the layer which is lying opposite the first surface region; and, wherein the layer has a sound reflectance of at least 80% for a sound wave striking the first surface region which is measured at a reference frequency (f) of:

$$f = c/((R+r) \cdot \pi)$$

where R is the nominal tire diameter, r is the nominal rim diameter, and c=343 m/s.

18. The wheel rim as claimed in claim 17 as used for a vehicle wheel.

19. A pneumatic vehicle tire comprising:
   a profiled tread, a carcass connected to the profiled tread and an inner layer connected to the carcass;
   a bead region connected to a rim;
   an inside air space defined by the inner layer, the bead region and the rim;
   an acoustic element bonded to the inner layer radially inward and below the profiled tread, the acoustic element comprising:
      a body having a porous foam material for dampening noise and a spring constant of 100 N/m to 20 000 N/m; and
      an air permeable layer connected to the body, the air permeable arranged on at least 15% of the surface of the body and having a flexural stiffness of 100 Nm to 6000 Nm and acoustic impedance of $0.8 \cdot 10^6$ Ns/m$^3$ to $18 \cdot 10^6$ Ns/m$^3$ and a spring constant of 100 N/m to 20 000 N/m;
   the air permeable layer further having a sound reflectance of at least 80% for a sound wave striking the first surface region which is measured at a reference frequency (f) of:

$$f = c/((R+r) \cdot \pi)$$

where R is the nominal tire diameter, r is the nominal rim diameter, and c=343 m/s.

* * * * *